United States Patent
Miny et al.

(10) Patent No.: US 12,038,015 B2
(45) Date of Patent: Jul. 16, 2024

(54) ROTOR STRUCTURE FOR A TURBOMACHINE WITH FEATURES TO CONTROL RELATIVE GROWTH AT AXIAL INTERFACES

(71) Applicant: Siemens Energy Global GmbH & Co. KG, Munich (DE)

(72) Inventors: Kevin Miny, Essen (DE); Christian Rickelt, Duisburg (DE); Bernhard Langenfeld, Mülheim an der Ruhr (DE); Florian Kretschmer, Fuldabrück (DE)

(73) Assignee: Siemens Energy Global GmbH & Co. KG, Munich (DE)

( * ) Notice: Subject to any disclaimer, the term of this patent is extended or adjusted under 35 U.S.C. 154(b) by 0 days.

(21) Appl. No.: 17/997,941

(22) PCT Filed: May 14, 2020

(86) PCT No.: PCT/US2020/032936
§ 371 (c)(1),
(2) Date: Nov. 4, 2022

(87) PCT Pub. No.: WO2021/230873
PCT Pub. Date: Nov. 18, 2021

(65) Prior Publication Data
US 2023/0175520 A1 Jun. 8, 2023

(51) Int. Cl.
*F04D 29/26* (2006.01)
*F04D 17/12* (2006.01)
(Continued)

(52) U.S. Cl.
CPC ......... *F04D 29/266* (2013.01); *F04D 17/122* (2013.01); *F04D 29/054* (2013.01); *F04D 29/624* (2013.01); *F16D 1/076* (2013.01)

(58) Field of Classification Search
CPC ...... F04D 17/12; F04D 17/122; F04D 29/053; F04D 29/054; F04D 29/266; F04D 29/624; F16D 1/076
See application file for complete search history.

(56) References Cited

U.S. PATENT DOCUMENTS

| | | | |
|---|---|---|---|
| 2,650,017 A * | 8/1953 | Pedersen | F02C 3/06 416/244 R |
| 4,224,010 A | 9/1980 | Fujino | |

(Continued)

FOREIGN PATENT DOCUMENTS

JP 2006138255 A 6/2006

OTHER PUBLICATIONS

International Search Report and Written Opinion of the International Searching Authority mailed Jan. 26, 2021 corresponding to PCT Application No. PCT/US2020/032936 filed May 14, 2020.

*Primary Examiner* — David E Sosnowski
*Assistant Examiner* — Aye S Htay

(57) ABSTRACT

Rotor structure for a turbomachine, such as a centrifugal compressor, is provided. Disclosed embodiments make use of structural and/or operational relationships (e.g., distinct axially-extending zones in the radially-inner contour of respective impeller bodies configured to balance mass distribution about a rotor axis) designed to control relative radial and/or axial growth between corresponding interface locations along the rotor axis at which corresponding faces of respective hirth couplings mesh with one another. The ability to control relative radial and/or axial growth between corresponding interface locations may be effective for reducing rotor vibration and/or to establish more reliable contact patterns and reduced levels of mechanical stresses and distortion (e.g., angular distortion) at the hirth coupling interfaces.

13 Claims, 2 Drawing Sheets

(51) Int. Cl.
    *F04D 29/054*     (2006.01)
    *F04D 29/62*     (2006.01)
    *F16D 1/076*     (2006.01)

(56) References Cited

U.S. PATENT DOCUMENTS

| | | | | |
|---|---|---|---|---|
| 2011/0262284 | A1* | 10/2011 | Guernard | F04D 17/122 |
| | | | | 29/428 |
| 2012/0321465 | A1* | 12/2012 | Guenard | F04D 17/122 |
| | | | | 416/124 |
| 2016/0319820 | A1* | 11/2016 | Venkatachalam | F04D 29/054 |

\* cited by examiner

ROTOR STRUCTURE FOR A TURBOMACHINE WITH FEATURES TO CONTROL RELATIVE GROWTH AT AXIAL INTERFACES

BACKGROUND

1. Field

Disclosed embodiments relate generally to the field of turbomachinery, and, more particularly, to a rotor structure for a turbomachine, and, even more particularly, to a rotor structure with structural features designed to accommodate or otherwise control relative growth, such as radial and/or axial growth between corresponding axial interface locations.

2. Description of the Related Art

Turbomachinery is used extensively in the oil and gas industry, such as for performing compression of a process fluid, conversion of thermal energy into mechanical energy, fluid liquefaction, etc. One example of such turbomachinery is a compressor, such as a centrifugal compressor.

DETAILED DESCRIPTION

Figure 1:
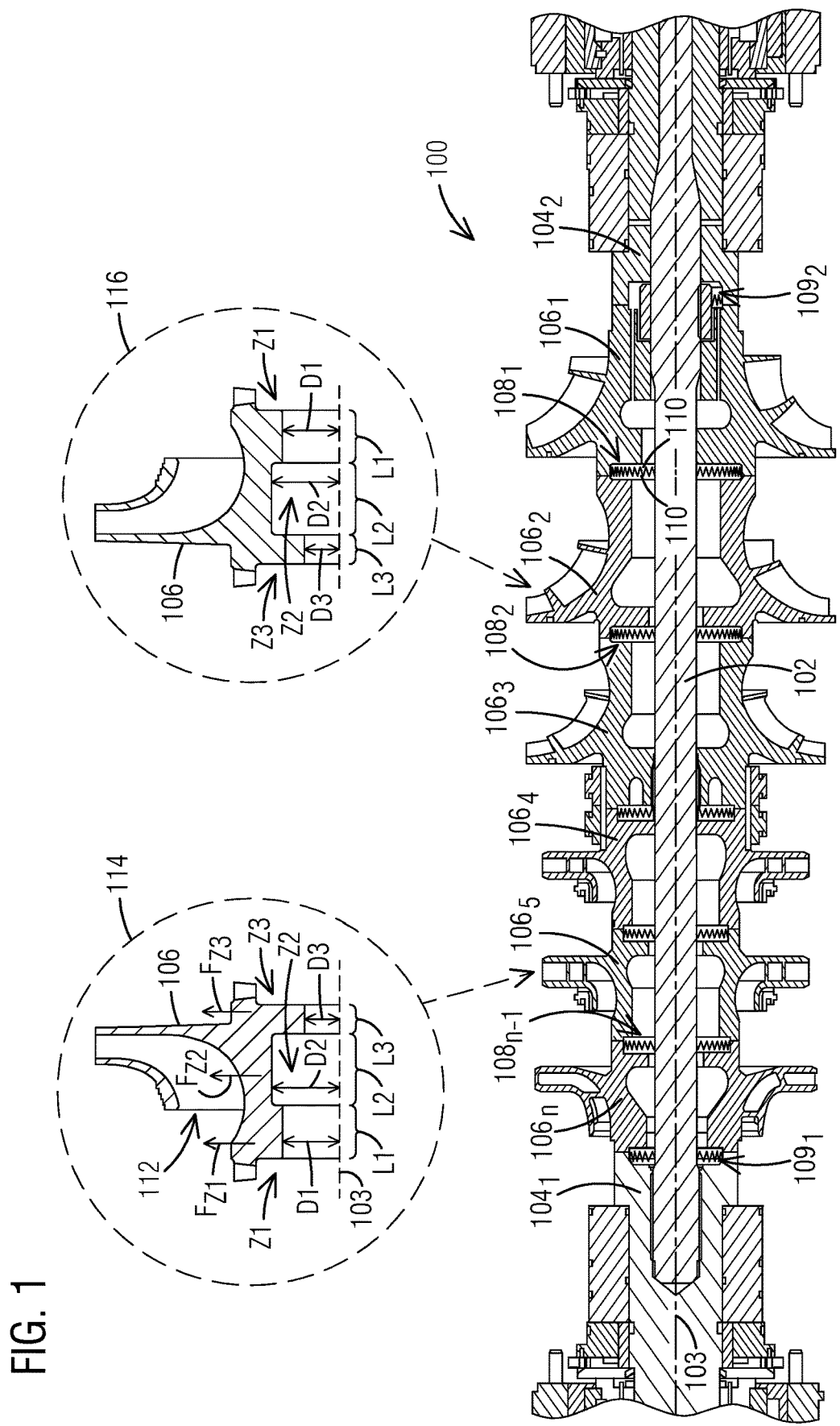
FIG. 1 illustrates a fragmentary cross-sectional view of one non-limiting embodiment of a disclosed rotor structure, as may be used in industrial applications involving turbomachinery, such as without limitation, centrifugal compressors.

As would be appreciated by those skilled in the art, turbomachinery, such as centrifugal compressors, may involve rotors of tie bolt construction (also known in the art as thru bolt or tie rod construction), where the tie bolt supports a plurality of impeller bodies and where adjacent impeller bodies may be interconnected to one another by way of elastically averaged techniques, such as involving hirth couplings or curvic couplings. As would be appreciated by the artisan, these coupling types use different forms of face gear teeth (straight and curved, respectively) to form a coupling between two components. As would be further appreciated by the artisan, these couplings and associated structures are typically subject to greatly varying forces (e.g., centrifugal forces) during operation of the turbomachine.

The present inventors have recognized that during operation of known turbomachinery, such as from an initial rotor speed of zero revolutions per minute (RPM) to a maximum rotor speed, (e.g., as may involve tens of thousands of RPM) different deflections (e.g., involving relative radial and/or axial growth) may develop at axial interface locations and this relative growth is undesirable. For example, high relative radial and/or axial growth at the axial interface locations could lead to increases in rotor vibration and could further lead to angular misalignments at the axial interface locations that can potentially lead to impaired contact patterns and increased levels of mechanical stresses and distortion at the hirth coupling interfaces.

In view of the foregoing considerations, disclosed embodiments make use of innovative structural features designed to reliably and cost-effectively accommodate or otherwise control or regulate relative radial and/or axial growth between corresponding interface locations, which may be effective for reducing rotor vibration over the life of a given turbomachine. The ability to control relative radial and/or axial growth between corresponding interface locations may be further effective to reduction of angular misalignments at the axial interface locations, which in turn would be effective to establish reliable contact patterns and reduced levels of mechanical stresses and distortion (e.g., angular distortion) at the hirth coupling interfaces.

In the following detailed description, various specific details are set forth in order to provide a thorough understanding of such embodiments. However, those skilled in the art will understand that disclosed embodiments may be practiced without these specific details that the aspects of the present invention are not limited to the disclosed embodiments, and that aspects of the present invention may be practiced in a variety of alternative embodiments. In other instances, methods, procedures, and components, which would be well-understood by one skilled in the art have not been described in detail to avoid unnecessary and burdensome explanation.

Furthermore, various operations may be described as multiple discrete steps performed in a manner that is helpful for understanding embodiments of the present invention. However, the order of description should not be construed as to imply that these operations need be performed in the order they are presented, nor that they are even order dependent, unless otherwise indicated. Moreover, repeated usage of the phrase "in one embodiment" does not necessarily refer to the same embodiment, although it may. It is noted that disclosed embodiments need not be construed as mutually exclusive embodiments, since aspects of such disclosed embodiments may be appropriately combined by one skilled in the art depending on the needs of a given application.

FIG. 1 illustrates a fragmentary cross-sectional view of one non-limiting embodiment of a disclosed rotor structure 100, as may be used in industrial applications involving turbomachinery, such as without limitation, compressors (e.g., centrifugal compressors, etc.).

In one disclosed embodiment, a tie bolt 102 extends along a rotor axis 103 between a first end and a second end of the tie bolt 102. A first rotor shaft $104_1$ may be fixed to the first end of tie bolt 102. A second rotor shaft $104_2$ may be fixed to the second end of tie bolt 102. Rotor shafts $104_1$, $104_2$ may be referred to in the art as rotor shafts. A plurality of impeller bodies 106, such as impeller bodies $106_1$ through $106_n$, may be disposed between rotor shafts $104_1$, $104_2$. In the illustrated embodiment, the number of impeller bodies is six and thus n=6; it will be appreciated that this is just one example and should not be construed in a limiting sense regarding the number of impeller bodies that may be used in disclosed embodiments. The embodiment illustrated in FIG. 1 involves a center-hung configuration of back-to-back impeller stages; it will be appreciated that this is just one example configuration and should not be construed in a limiting sense regarding the applicability of disclosed embodiments.

The plurality of impeller bodies 106 is supported by tie bolt 102 and is mechanically coupled to one another along the rotor axis by way of a plurality of hirth couplings, such as hirth couplings $108_1$ through $108_{n-1}$. In the illustrated embodiment, since as noted above, the number of impeller bodies is six, then the number of hirth couplings would be five. It will be appreciated that two additional hirth couplings $109_1$ and $109_2$ may be used to respectively mechanically couple the impeller bodies $106_n$, $106_1$ respectively proximate to the first and second ends of tie bolt 102 to rotor shafts $104_1$, $104_2$.

In disclosed embodiments, as may be better conceptually appreciated in respective zoomed-in views 114 and 116 of non-limiting representative impeller bodies $106_5$ and $106_2$, a radially-inner contour of an impeller body 106 of the plurality of impeller bodies may be characterized by at least two distinct axially-extending zones (e.g., Z1, Z3) each having a respective geometry configured to control relative radial and/or axial growth between corresponding interface locations along the rotor axis at which corresponding faces 110 (FIG. 1) of a respective hirth coupling 108 mesh or otherwise engage with one another. In one non-limiting embodiment, three distinct axially-extending zones may be involved, such as a first axially-extending zone Z1, a second-axially-extending zone Z3 and an intermediate axially-extending zone Z2, which is disposed between first and second axially-extending zones Z1 and Z3.

In one non-limiting embodiment, the respective geometry of the at least two axially-extending zones may be characterized by a differing bore diameter size (e.g., D1, D2, D3). That is, the respective bore diameters of zones Z1, Z2, Z3 may each have different sizes relative to one another. In another non-limiting embodiment, the respective geometry of the at least two axially-extending zones (e.g., zones Z1, Z2, Z3) may be characterized by a differing axial length (e.g., L1, L2 L3). That is, the respective axial lengths of zones Z1, Z2, Z3 may each have different lengths relative to one another. In still another non-limiting embodiment, the respective geometry of the at least two axially-extending zones may be characterized by at least one of the following: a differing bore diameter size, and a differing axial length. That is, a differing bore diameter size or a differing axial length, or both.

Because of cross-sectional shape resemblance, without limitation, first axially-extending zone Z1 may be conceptually analogized to the toe section in an stiletto-style shoe; second-axially-extending zone Z3 may be conceptually analogized to the heel section of the shoe; and intermediate axially-extending zone Z2 may be conceptually analogized to the shank section disposed between the toe section and the heel section of the shoe.

Accordingly, in view of the above-noted shape resemblance, first axially-extending zone Z1 may be referred to as an impeller toe section; second-axially-extending zone Z3 may be referred to as an impeller heel section; and intermediate axially-extending zone Z2 may be referred to as an impeller shank section. The respective geometry of such toe, shank and heel impeller sections may each be configured to control the relative radial and/or axial growth that, for example, can develop between the impeller heel section and toe section of certain adjacent impellers, such as between the toe section of impeller body $106_5$ and the heel section of impeller body $106_n$; or, in another example, can develop between the respective impeller heel sections of adjacent impellers at the midspan of tie bolt 102, such as between the heel section of impeller body $106_3$ and the corresponding heel section of impeller body $106_4$.

Without limitation, the respective geometries of such sections of the impeller bodies may be appropriately configured to appropriately balance mass distribution and in effect balance the mass moment of inertia about the axis of rotation of the impeller bodies so that in turn the respective resulting centrifugal forces that develop in the toe, shank and heel impeller sections are appropriately balanced (e.g., in the impeller body illustrated in the zoomed-in view 114, the respective resulting centrifugal forces are schematically represented by arrows $F_{z1}$, $F_{z2}$ and $F_{z3}$).

The foregoing structural and/or operational relationships are conducive in disclosed embodiments to control the relative radial and/or axial growth that can develop between corresponding interface locations along the rotor axis at which corresponding faces 110 of a respective hirth coupling 108 mesh or otherwise engage with one another, such as between the corresponding impeller heel section and toe section of certain adjacent impeller bodies.

It will be appreciated that the zoomed-in views 114 and 116 shown in FIG. 1 of impeller bodies 106 illustrate a constant bore diameter in connection with zones Z1, Z2, Z3; it will be appreciated that such zones need not have a constant bore diameter. For example, the respective geometry of intermediate zone Z2 may be characterized by a varying bore diameter along rotor axis 103. In one non-limiting embodiment a maximum value of the varying bore diameter of intermediate zone Z2 may be larger relative to the respective bore diameters (D1, D3) of the first and second axially-extending zones (Z1, Z3). That is, if one were to revolve the radially-inner contour of intermediate zone Z2 about the axis of revolution (e.g., rotor axis 103), then a resulting surface of revolution need not be a cylindrical surface but, without limitation, could be at least one conical surface or another non-cylindrical surface of revolution or combination of such surfaces.

By way of example, second axially-extending zone Z3 of the radially-inner contour of the impeller body may be located axially downstream relative to first axially-extending zone Z1 of the radially-inner contour of impeller body 106 and relative to an inlet eye 112 of impeller body 106.

Figure 2:
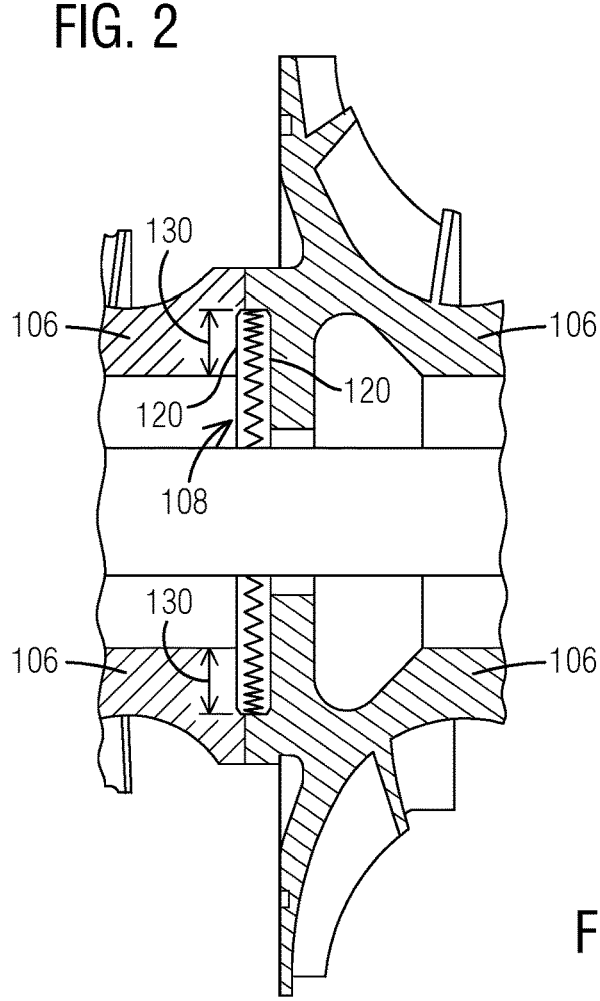
FIGS. 2 and 3 respectively illustrate zoomed-in views of portions of the rotor structure shown in FIG. 1 that may be used for illustrating and describing certain non-limiting structural and/or operational relationships in connection with the disclosed rotor structure.

As may be better appreciated in FIG. 2, mutually opposed axial sides of first and second axially-extending zones Z1, Z3 of adjacent impeller bodies 106 may define respective notches 120 configured to receive a radially-outward portion 130 of the corresponding faces of the respective hirth coupling 108 that mesh with one another. Since the respective notches 120 defined by the mutually opposed axial sides of first and second axially-extending zones Z1, Z3 of adjacent impeller bodies 106 are subject to controlled relative radial and/or axial growth, this feature is effective to inhibit misalignments and/or mechanical stresses that otherwise could develop between the corresponding faces of the respective hirth coupling.

Figure 3:
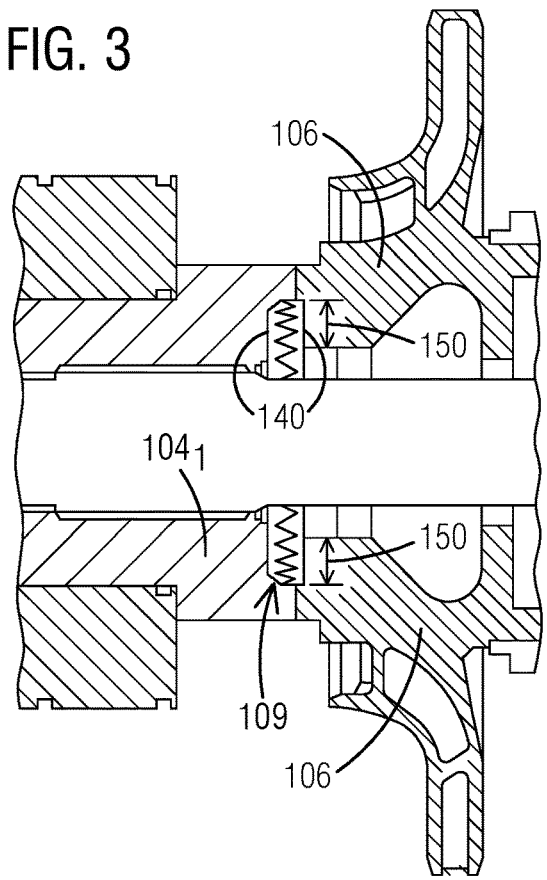

As suggested above, an axial side of the first axially-extending zone Z1 of impeller body 106, proximate to the first end of tie bolt 102 is mechanically coupled to first rotor shaft $104_1$ by way of a further hirth coupling (e.g., hirth coupling $109_1$). In this case, as illustrated in FIG. 3, the axial side of the first axially-extending zone Z1 of impeller body $106_n$ and a corresponding axial face of first rotor shaft $104_1$ define respective notches 140 for supporting a radially-outward portion 150 of the corresponding faces of further hirth coupling $109_1$. Since the respective notches defined by the axial side of first axially-extending zone of impeller body $106_n$ and the corresponding axial face of first rotor shaft $104_1$ are subject to controlled relative radial and/or axial growth, this feature is effective to inhibit misalignments and/or mechanical stresses that otherwise could develop between the corresponding faces of hirth coupling $109_1$.

The foregoing structural and/operational relationships are equally applicable to the axial side of first axially-extending zone Z1 of impeller body $106_1$, which is proximate to the second end of the tie bolt and which is mechanically coupled to second rotor shaft $104_2$ by way of another hirth coupling (e.g., hirth coupling $109_2$). Accordingly, to spare the reader from pedantic and burdensome repetitive details, the foregoing structural and/operational relationships will not be disclosed again.

In operation, disclosed embodiments include structural and/or operational relationships (e.g., distinct axially-extending zones in the radially-inner contour of respective impeller bodies configured to balance mass distribution about the rotor axis) designed to control relative radial and/or axial growth between corresponding interface locations, thereby reducing rotor vibration over the life of a given turbomachine. Additionally, in operation disclosed embodiments offer superior and reliable contact pattern and reduced annular distortion at hirth coupling interfaces.

While embodiments of the present disclosure have been disclosed in exemplary forms, it will be apparent to those skilled in the art that many modifications, additions, and deletions can be made therein without departing from the scope of the invention and its equivalents, as set forth in the following claims.

What is claimed is:

1. A rotor structure for a compressor, the rotor structure comprising:
    a tie bolt that extends along a rotor axis between a first end and a second end of the tie bolt;
    a first rotor shaft fixed to the first end of the tie bolt;
    a second rotor shaft fixed to the second end of the tie bolt;
    a plurality of impeller bodies disposed between the rotor shafts, the plurality of impeller bodies supported by the tie bolt and mechanically coupled to one another along the rotor axis by way of a plurality of hirth couplings, wherein a radially-inner contour of an impeller body of the plurality of impeller bodies is characterized by at least two distinct axially-extending zones each having a respective geometry configured to balance mass distribution about the rotor axis and control relative radial and/or axial growth between corresponding interface locations along the rotor axis at which corresponding faces of a respective hirth coupling of the plurality of hirth couplings mesh with one another;
    wherein the radially-inner contour of the impeller body comprises a first axially-extending zone, a second-axially-extending zone and an intermediate axially-extending zone, which is disposed between the first and second axially-extending zones, and
    wherein the respective geometry of the intermediate zone is characterized by a varying bore diameter along the rotor axis, wherein a maximum of the varying bore diameter of intermediate zone is larger relative to the respective bore diameters of the first and second axially-extending zones.

2. The rotor structure of claim 1, wherein the respective geometry of the at least two axially-extending zones is characterized by a differing bore diameter size.

3. The rotor structure of claim 1, wherein the respective geometry of the at least two axially-extending zones is characterized by a differing axial length.

4. The rotor structure of claim 1, wherein the respective geometry of the at least two axially-extending zones is characterized by at least one of the following: a differing bore diameter size, and a differing axial length.

5. The rotor structure of claim 1, wherein the second axially-extending zone of the radially-inner contour of the impeller body is located axially downstream relative to the first axially-extending zone of the radially-inner contour of the impeller body and relative to an inlet eye of the impeller.

6. The rotor structure of claim 5, wherein mutually opposed axial sides of the first and second axially-extending zones of the radially-inner contour of the impeller body define respective notches configured to receive a radially-outward portion of the corresponding faces of the respective hirth coupling that mesh with one another.

7. The rotor structure of claim 6, wherein the respective notches defined by the mutually opposed axial sides of the first and second axially-extending zones of the radially-inner contour of the impeller body being subject to controlled relative radial and/or axial growth are effective to inhibit misalignment between the corresponding faces of the respective hirth coupling that mesh with one another.

8. The rotor structure of claim 1, wherein an axial side of the first axially-extending zone of the radially-inner contour of an impeller body proximate the first end of the tie bolt is mechanically coupled to the first rotor shaft by way of a further hirth coupling, wherein the axial side of the first axially-extending zone of the impeller body proximate the first end of the tie bolt and the corresponding axial face of the first rotor shaft define respective notches for supporting a radially-outward portion of the corresponding faces of the further hirth coupling that mesh with one another.

9. The rotor structure of claim 8, wherein the respective notches defined by the axial side of the first axially-extending zone of the impeller body proximate the first end of the tie bolt and the corresponding axial face of the first rotor shaft being subject to controlled relative radial and/or axial growth are effective to inhibit misalignment between the corresponding faces of the further hirth coupling.

10. The rotor structure of claim 9, wherein an axial side of the first axially-extending zone of the radially-inner contour of an impeller body proximate the second end of the tie bolt is mechanically coupled to the second rotor shaft by way of another hirth coupling, wherein the axial side of the first axially-extending zone of the impeller body proximate the second end of the tie bolt and the corresponding axial face of the second rotor shaft define respective notches for receiving a radially-outward portion of the corresponding faces of the another birth coupling that mesh with one another.

11. The rotor structure of claim 10, wherein the respective notches defined by the axial side of the first axially-extending zone of the impeller body proximate the second end of the tie bolt and the corresponding axial face of the second rotor shaft being subject to controlled relative radial and/or axial growth are effective to inhibit misalignment between the corresponding faces of the another birth coupling.

12. The rotor structure of claim 1, wherein a respective surface of revolution defined by a respective axially-extending zone of the first, second, and intermediate axially-extending zones is selected from the group consisting of a cylindrical surface of revolution, a conical surface of revolution, and a combination of two or more of a cylindrical surface of revolution and a conical surface of revolution.

13. A centrifugal compressor comprising the rotor structure of claim 1.

* * * * *